United States Patent
Keller et al.

(10) Patent No.: US 6,204,582 B1
(45) Date of Patent: Mar. 20, 2001

(54) SERVO MOTOR ASSEMBLY AND METHOD OF MAKING SAME

(75) Inventors: Robert D. Keller, Davisburg; Mike Jurcak, Columbus, both of MI (US)

(73) Assignee: Eaton Corporation, Cleveland, OH (US)

(*) Notice: Subject to any disclaimer, the term of this patent is extended or adjusted under 35 U.S.C. 154(b) by 0 days.

(21) Appl. No.: 09/465,156

(22) Filed: Dec. 16, 1999

(51) Int. Cl.[7] .............................. H02K 5/00; H02K 11/00
(52) U.S. Cl. .................................... 310/89; 310/71
(58) Field of Search ...................... 310/89, 71, 91, 310/67 R; 29/596–598

(56) References Cited

U.S. PATENT DOCUMENTS

| | | | | |
|---|---|---|---|---|
| 4,513,214 | * | 4/1985 | Dieringer | 310/71 |
| 4,707,627 | * | 11/1987 | Best | 310/71 |
| 5,430,931 | * | 7/1995 | Firsher et al. | 29/596 |
| 5,532,534 | * | 7/1996 | Baker et al. | 310/89 |
| 5,714,815 | * | 2/1998 | Fritzinger et al. | 310/89 |
| 5,861,689 | * | 1/1999 | Snider et al. | 310/71 |

\* cited by examiner

*Primary Examiner*—Tran Nguyen
(74) *Attorney, Agent, or Firm*—Roger A. Johnston

(57) ABSTRACT

A servo motor assembly having a cylindrical motor casing with connector terminals extending axially from one end and a driving shaft from the opposite end. An annular slotted ring has the connector terminals received therethrough and the ring is axially pressed into a housing having a connector receptacle for connection to a power source. The ring has projections on the outer periphery to frictionally retain the motor and ring in the housing and compress the ring to frictionally engage the motor casing and absorb any inertial reaction torque therebetween. Electrical leads are connected from the motor terminals to the receptacle on the housing.

12 Claims, 3 Drawing Sheets

SERVO MOTOR ASSEMBLY AND METHOD OF MAKING SAME

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The present invention relates to electrical servo actuators and particularly those of the type powered by a small relatively high RPM, low voltage motor such, as for example, would be utilized for on-board motor vehicle control functions.

It has become increasingly attractive from a cost and control resolution standpoint to employ electrically operated servo actuators for controls in a motor vehicle such as those used for actuating an air flow valve either for engine air flow control or for controlling flow in the vehicle climate control system. Actuators of this type typically operate with a sub-fractional horsepower direct current motor operating at high RPM with low torque with the motor driving the device to be actuated through a speed reduction unit such as a gear train.

Heretofore, such servo actuators employed in motor vehicle applications have required relatively costly and complicated brackets and fasteners for attaching the motor to the servo actuator housing and for connecting the motor electrical terminals to the vehicle wiring harness. In addition, it has been found difficult to assemble the servo actuator and to mount the motor and make the electrical connections in high volume mass production for passenger car and light truck vehicles.

During the assembly process, loose wires are difficult to contain and prevent damage. This new device provides unique protection which prevents misrouting, cutting and scraping, shorting and pinching of the loose wires which improves robustness. This design also protects against solder shorts via the flange around the terminals to shield solder bridges from reaching the motor housing.

Upon the load device, such as an air valve, reaching its limit of travel or hitting internal stops provided for the position of the valve member at a fully open or fully closed position, the motor, operating at a relatively high RPM on the order of 3000 RPM is subjected to a significant sudden inertial reaction torque. Therefore, it has been found necessary to provide for the motor mounts to absorb the reaction torque and has thus complicated the mounting of the motor and required costly fasteners.

Thus, it has long been desired to provide a motorized servo actuator, particularly one for low voltage operation, which is relatively low in manufacturing cost, easy to assembly and provides for absorption of sudden inertial reaction torque against the motor mounts encountered upon the servo actuator reaching its limit position with the motor turning at a relatively high RPM.

BRIEF SUMMARY OF THE INVENTION

The present invention provides a servo motor assembly for connection to a control device to be actuated, as for example, an air valve or vane member for controlling air flow in a motor vehicle engine or for controlling flow in a vehicle passenger compartment climate control system. The servo motor assembly of the present invention employs a relatively low voltage, high RPM motor of the sub-fractional horsepower type which is adapted for driving a gear train through a pinion on a motor shaft for reducing the speed output of the actuator and multiplying the motor torque for the particular control function.

The servo motor assembly of the present invention has a resilient ring mounted over one end of the motor with a radially inwardly extending flange having slots therein for the axially disposed motor electrical terminals to extend therethrough and prevent relative rotation of the ring with respect to the motor. The motor and ring are then axially pressed into a housing having an electrical receptacle provided thereon; and, the ring is compressed and frictionally engages the housing with sufficient force to prevent relative rotation of the motor with respect thereto in the event of sudden torque reaction from the gear train. The compression of the annular ring is sufficient to cause the inner periphery thereof to frictionally engage the motor casing and retain the motor therein. The motor terminals are connected to the housing receptacle by flexible electrical leads connected prior to assembly of the motor and the housing, as, for example, by soldering.

The present invention thus provides a robust, easy to assemble technique for mounting a servo motor on the actuator housing in a manner which facilitates assembly in high volume mass production and which is relatively low in manufacturing costs and eliminates separate motor mounting fasteners.

DETAILED DESCRIPTION OF THE INVENTION

Figure 1:
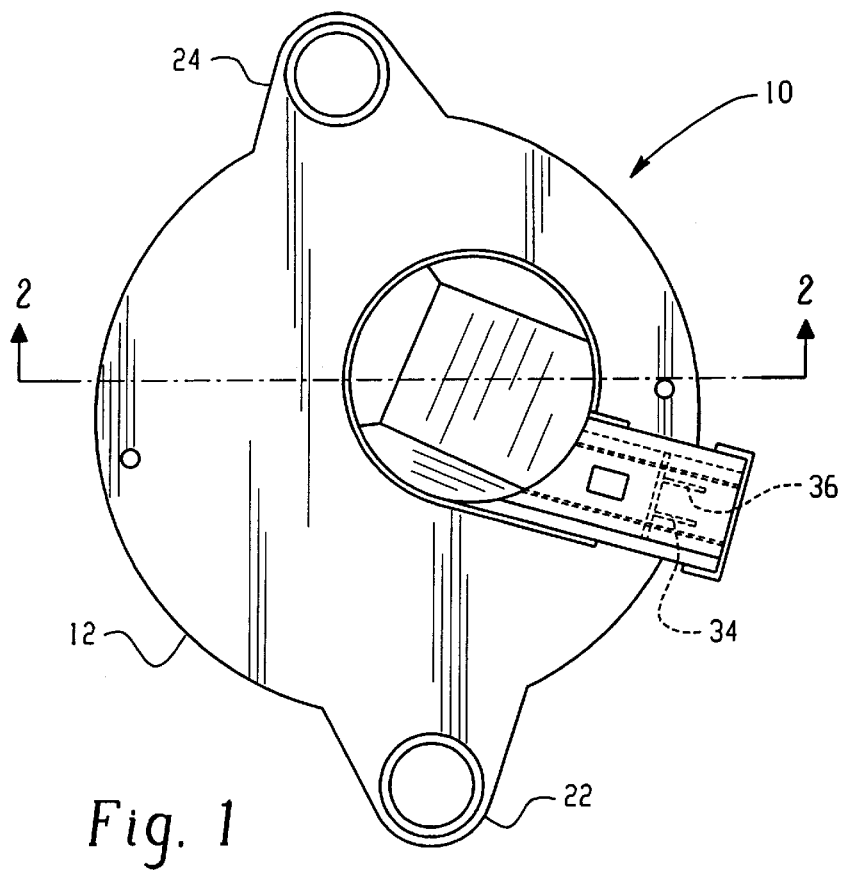
FIG. 1 is a top view of the servo motor assembly of the present invention.
Figure 2:
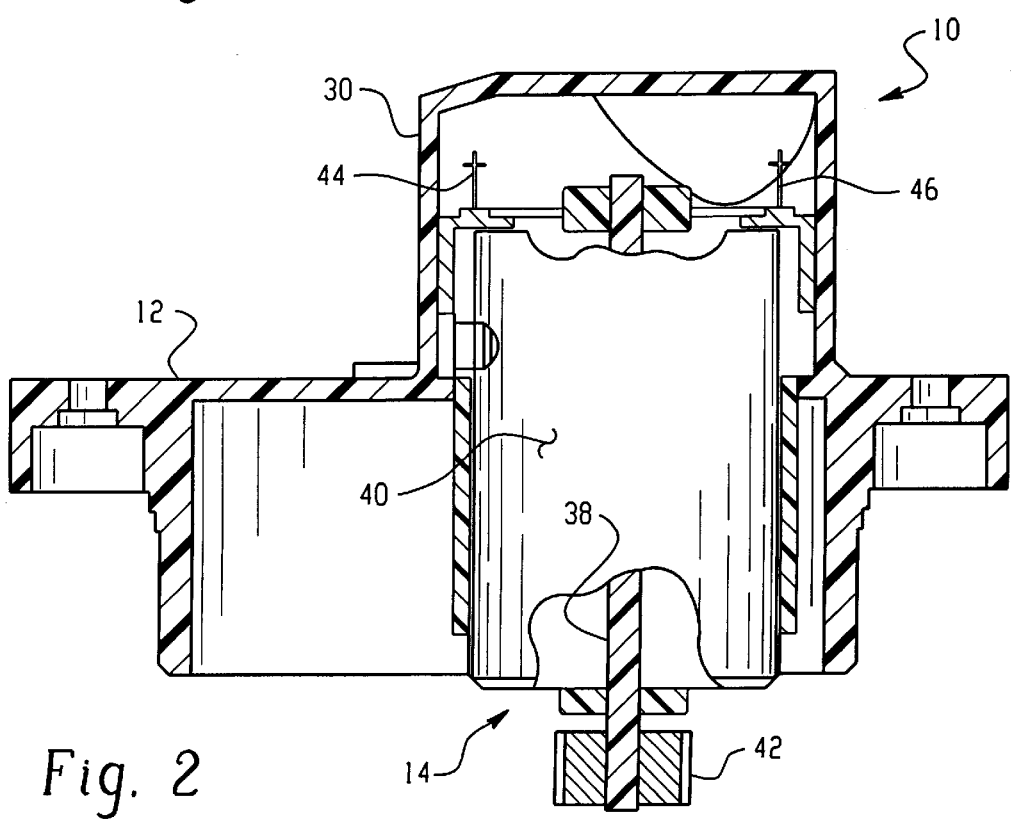
FIG. 2 is a section view taken along section indicating lines 2—2 of FIG. 1.

Referring to FIGS. 1 through 5, the servo motor assembly of the present invention is indicated generally at 10 and includes a housing 12, a motor indicated generally at 14, an annular mounting member 16 and a pair of electrical leads 18, 20. The housing 12 includes a pair of oppositely disposed lugs or projections 22, 24 which are apertured at 26, 28 respectively for receiving therethrough suitable mounting fasteners (not shown) for attachment to a device to be actuated (not shown). The housing further includes a generally hollow tower portion 30 extending upwardly therefrom which has formed preferably integrally therewith an electrical receptacle 32 which includes terminal pins 34, 36 shown in dashed outline in FIG. 1.

Motor 14 has a rotating shaft 38 extending outwardly from one end of a generally cylindrical outer shell or casing 40 which houses the unshown motor stator coils and rotor disposed therewithin; and, shaft 38 has a drive gear or pinion 42 mounted on the end thereof for driving rotation therewith.

Motor casing 40 has a pair of electrical terminals 44, 46 extending axially therefrom in spaced arrangement and are located on the end of the motor casing 40 opposite from the drive gear 42.

Figure 3:
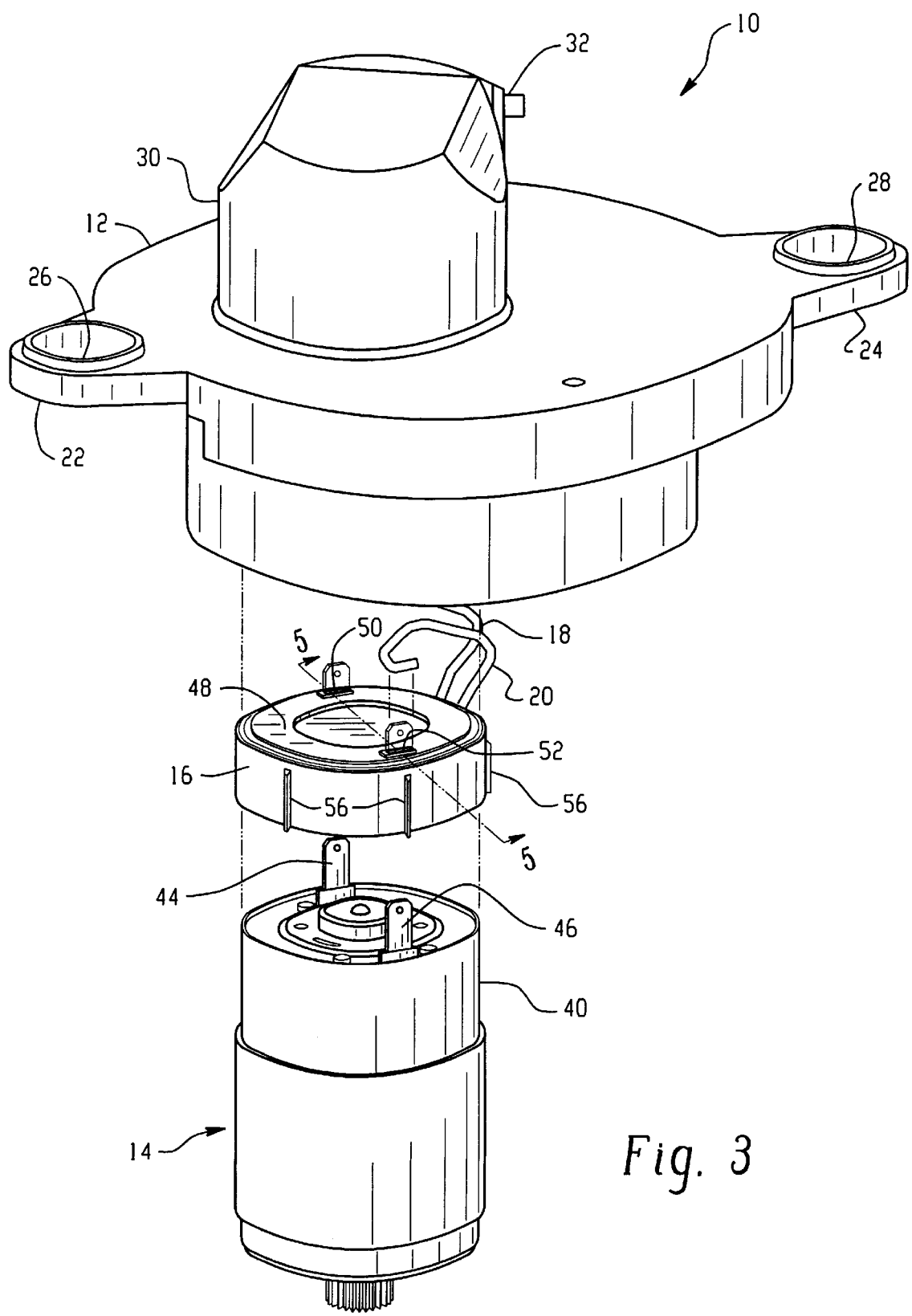
FIG. 3 is an exploded view of the assembly of FIG. 1 viewed from the top of the assembly housing.
Figure 4:
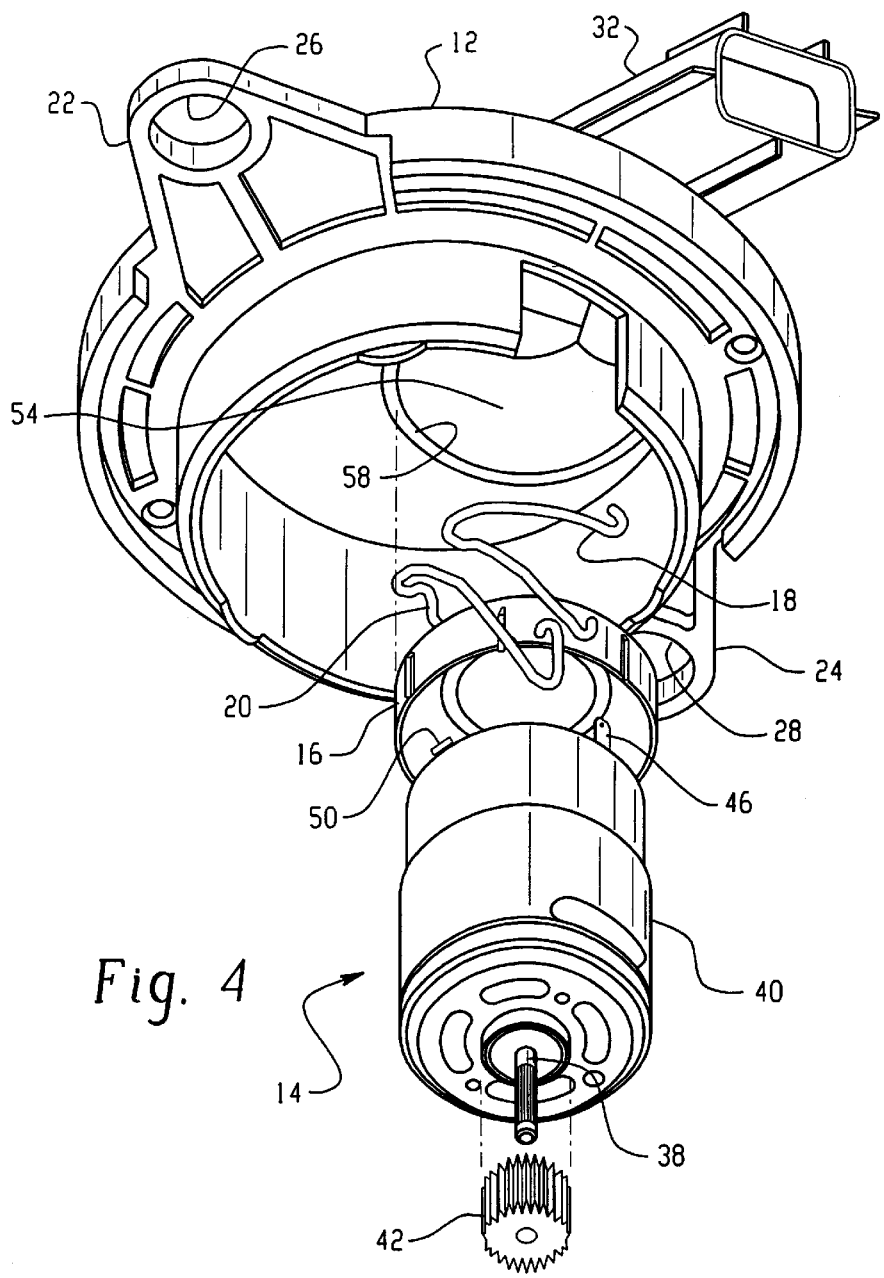
FIG. 4 is an exploded view of the assembly of FIG. 1 viewed from the bottom of the housing; and, FIG. 5 is a section view taken along section indicating lines 5—5 of FIG. 3.
Figure 5:
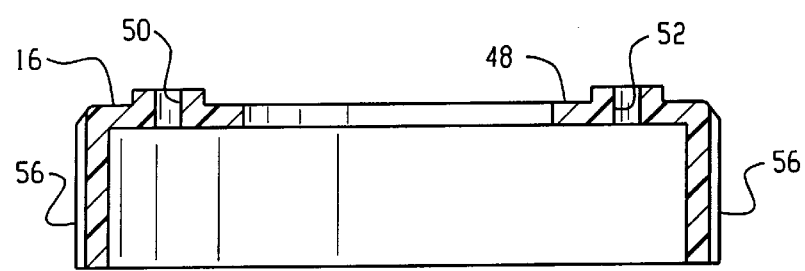

Referring to FIGS. 3, 4 and 5, the annular member or ring 16 has a radially inwardly extending flange portion 48 which has a pair of spaced, preferably diametrally oppositely disposed slots 50, 52 formed therein which have motor terminals 44, 46 received therethrough in closely fitting arrangement with an end of one of leads 18, 20 connected respectively thereto, preferably by soldering. The position of the terminals 44, 46 as received through slots 50, 52 is shown in dashed outline in FIG. 3. It will be understood that the opposite end of leads 18, 20 are each connected to one of the terminals 34, 36 through the interior hollow 54 of tower 30.

Ring 16 has provided about the outer periphery thereof a plurality of circumferentially spaced projections or lugs 56 formed thereon which, upon assembly of the motor terminals through flange 48, and axial insertion of the motor and ring 16 into the hollow interior of tower 30, motor lugs 56 are configured to provide an interference fit with the annular surface 58 in the underside of housing 12 thereby compressing the ring 16 and frictionally engaging the inner periphery of the ring with motor casing 40 and axially retaining the motor securely in the ring and resisting any inertial reaction torque. The frictional engagement of lugs 56 with the surface 58 is sufficient to absorb any sudden inertial reaction torque on the motor housing due to the actuator engaging the gear 42 reaching the limit of its travel position.

The present invention thus provides a simple, economical and relatively easy-to-assemble yet robust construction for a servo motor assembly which is adapted for connection to a gear train through gear 42 on the motor shaft and for providing control of a device, as for example, an air vane, in response to an electrical control signal from an electronic controller.

Although the invention has hereinabove been described with respect to the illustrated embodiments, it will be understood that the invention is capable of modification and variation and is limited only by the following claims.

What is claimed is:

1. A servo motor assembly comprising:
   (a) a motor having an outer casing with at least one motor electrical terminal thereon and including a rotating shaft for driving connection to a load;
   (b) a housing having a mounting surface on the interior thereof and including at least one housing electrical terminal thereon adapted for external electrical connection thereto;
   (c) an annular mounting member having first surfaces disposed on the inner periphery thereof and second surfaces on the outer periphery thereof, wherein said annular member is radially compressed by contact of said second surfaces with said housing mounting surface, thereby causing said first surfaces to frictionally engage said casing and said second surfaces to frictionally engage said mounting surface for preventing relative rotation between said motor and said housing; and,
   (d) upon assembly of said annular member and said casing in said housing, said at least one motor electrical terminal is connected to said at least one housing electrical terminal.

2. The servo motor assembly defined in claim 1, wherein said at least one electrical terminal on said motor casing extends in an axial direction with respect to said rotor.

3. The servo motor assembly defined in claim 1, wherein said motor casing includes a pair of motor terminals extending axially through said annular member and said housing includes a pair of terminals, said motor terminals each having an electrical lead attached thereto and to said at least one housing electrical terminal.

4. The servo motor assembly defined in claim 1, wherein said casing includes a generally cylindrical shell.

5. The servo motor assembly defined in claim 1, wherein said casing has a pair of electrical terminals extending axially therefrom and each received through an aperture formed in said annular member in closely fitting arrangement.

6. The servo motor assembly defined in claim 5, wherein each of said terminals has an electrical lead soldered thereto.

7. The servo motor assembly defined in claim 1, wherein said second surfaces comprise a plurality of projections disposed about said annular member in circumferentially spaced arrangement.

8. The servo motor assembly defined in claim 1, wherein said casing includes a generally cylindrical outer shell frictionally engaged by said first surfaces on said annular member.

9. The servo motor assembly defined in claim 1, wherein said annular member has a radially inwardly extending flange with a pair of apertures therein for receiving therethrough said at least one motor terminal.

10. The servo motor assembly defined in claim 1, wherein said surfaces include a plurality of projections formed in circumferentially equally spaced arrangement about said annular member.

11. The servo motor assembly defined in claim 1, wherein said second surfaces include a plurality of projections from the outer periphery of said annular member.

12. The servo motor assembly defined in claim 1, further comprising a driving gear associated with said rotor.

* * * * *